(12) United States Patent
Konradi et al.

(10) Patent No.: US 10,850,238 B2
(45) Date of Patent: Dec. 1, 2020

(54) PROCESSES FOR REDUCING THE FOULING OF SURFACES

(71) Applicant: SOLENIS TECHNOLOGIES, L.P., Wilmington, DE (US)

(72) Inventors: Rupert Konradi, Ladenburg (DE); Cristina Cepraga, Mannheim (DE); Claudia Staudt, Alzey (DE); Bernhard Von Vacano, Mannheim (DE); Matthias Kellermeier, Mannheim (DE); Peter Stengel, Schwanheim (DE); Roelf-Peter Baumann, Mannheim (DE); Laurent Marty, Heidelberg (DE); Jelan Kuhn, Mannheim (DE); Sarah-Jane Schauksdat, Hirschhorn (DE); Ludger Wegmann, Ludwigshafen (DE); Erik Bohrer, Maxdorf (DE)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 102 days.

(21) Appl. No.: 15/565,938

(22) PCT Filed: Apr. 12, 2016

(86) PCT No.: PCT/EP2016/057976
§ 371 (c)(1),
(2) Date: Oct. 12, 2017

(87) PCT Pub. No.: WO2016/166084
PCT Pub. Date: Oct. 20, 2016

(65) Prior Publication Data
US 2018/0056245 A1    Mar. 1, 2018

(30) Foreign Application Priority Data

Apr. 13, 2015 (EP) .................................... 15163306

(51) Int. Cl.
*B01D 67/00* (2006.01)
*B01D 65/08* (2006.01)
(Continued)

(52) U.S. Cl.
CPC ......... *B01D 67/0088* (2013.01); *A01N 25/10* (2013.01); *A01N 25/34* (2013.01);
(Continued)

(58) Field of Classification Search
CPC ........ B01D 69/06; B01D 71/28; B01D 71/40; B01D 69/08; B01D 65/08; B01D 67/0088; C08F 283/06; C09D 151/08
See application file for complete search history.

(56) References Cited

U.S. PATENT DOCUMENTS

| 5,480,953 A | 1/1996 | Sugaya et al. |
| 6,454,943 B1 | 9/2002 | Koenhen |

(Continued)

FOREIGN PATENT DOCUMENTS

| EP | 1 103 569 A2 | 5/2001 |
| JP | 2001213967 A | 8/2001 |

(Continued)

OTHER PUBLICATIONS

International Search Report and Written Opinion of the International Searching Authority dated May 24, 2016 in PCT/EP2016/057976 filed Apr. 12, 2016.

(Continued)

*Primary Examiner* — Vishal V Vasisth
(74) *Attorney, Agent, or Firm* — Lorenz & Kopf, LLP

(57) ABSTRACT

Process for reducing the fouling of a surface O, wherein an aqueous solution S of at least one polymer P comprising
(Continued)

styrene and at least one ester E of (meth)acrylic acid and polyethylene oxide in a molar ratio of 0.05:1 to 50:1 is applied to said surface O.

22 Claims, 1 Drawing Sheet

(51) Int. Cl.

| | | |
|---|---|---|
| *B01D 71/28* | (2006.01) | |
| *B01D 71/40* | (2006.01) | |
| *C09D 5/16* | (2006.01) | |
| *A01N 25/34* | (2006.01) | |
| *A01N 25/10* | (2006.01) | |
| *B01D 71/80* | (2006.01) | |
| *B01D 69/06* | (2006.01) | |
| *B01D 69/08* | (2006.01) | |
| *C08F 283/06* | (2006.01) | |
| *C09D 151/08* | (2006.01) | |
| *B01D 71/52* | (2006.01) | |

(52) U.S. Cl.
CPC .............. *B01D 65/08* (2013.01); *B01D 69/06* (2013.01); *B01D 69/08* (2013.01); *B01D 71/28* (2013.01); *B01D 71/40* (2013.01); *B01D 71/80* (2013.01); *C08F 283/06* (2013.01); *C09D 5/1668* (2013.01); *C09D 151/08* (2013.01); *B01D 71/52* (2013.01)

(56) References Cited

U.S. PATENT DOCUMENTS

| | | | |
|---|---|---|---|
| 6,670,428 | B1 | 12/2003 | Yasumura et al. |
| 6,787,216 | B1 | 9/2004 | Koenhen |
| 2002/0111429 | A1 | 8/2002 | Yasumura et al. |
| 2008/0237126 | A1 | 10/2008 | Hoek et al. |
| 2008/0314292 | A1 | 12/2008 | Shimanaka et al. |
| 2009/0272692 | A1 | 11/2009 | Kurth et al. |
| 2010/0062156 | A1 | 3/2010 | Kurth et al. |
| 2010/0224555 | A1 | 9/2010 | Hoek et al. |
| 2011/0005997 | A1 | 1/2011 | Kurth et al. |
| 2011/0027599 | A1 | 2/2011 | Hoek et al. |
| 2011/0207841 | A1* | 8/2011 | Kosar ................. B01D 71/34 521/134 |
| 2012/0285890 | A1 | 11/2012 | Koehler et al. |
| 2013/0228511 | A1 | 9/2013 | Chang et al. |
| 2014/0083931 | A1* | 3/2014 | Chang ................. C08F 220/28 210/500.34 |

FOREIGN PATENT DOCUMENTS

| | | |
|---|---|---|
| JP | 2006124714 A | 5/2006 |
| JP | 2009024165 A | 2/2009 |
| WO | WO 2006/012920 A1 | 2/2006 |
| WO | WO 2009/076722 A1 | 6/2009 |

OTHER PUBLICATIONS

Extended European Search Report dated Nov. 16, 2015 in Patent Application No. 15163306.2.

Ignác Capek, et al., "Dispersion Copolymerization of Poly(Oxyethylene) Macromonomers and Styrene" Journal of Polymer Science Part A: Polymer Chemistry, vol. 35, Issue 15, XP55226070, Nov. 15, 1997 pp. 3131-3139.

Yen-Che Chiag, et al., "Biofouling Resistance of Ultrafiltration Membranes Controlled by Surface Self-Assembled Coating with PEGylated Copolymers" Langmuir, vol. 28, Issue 2, Dec. 8, 2012, pp. 1399-1407.

Hyoungwoo Choi, et al., "Enhancing the Anti-Fouling Property of the SWRO Membrane Through the Surface Coating with the Styrene-PEGA Copolymer" Desalination and Water Treatment: Science and Engineering, vol. 15, Issue 1-3, XP55225676, Mar. 1, 2010, pp. 183-189 and cover letter.

Dong-Gyun Kim, et al., "The Increase of Antifouling Properties of Ultrafiltration Membrane Coated by Star-Shaped Polymers" Journal of Materials Chemistry, vol. 22, Issue 17, Jan. 1, 2012, pp. 8654-8661.

Rupert Konradi, et al., "Polyoxazolines for Nonfouling Surface Coatings—A Direct Comparison to the Gold Standard PEG" Macromolecular Rapid Communications, vol. 33, Issue 19, Oct. 15, 2012, pp. 1663-1676.

Youngnam Kwon, et al., "Development of Fouling-Resistant RO Membranes Using PEGA Macromere" Desalination and Water Treatment: Science and Engineering, vol. 15, Issue 1-3, XP55225675,Mar. 1, 2010, pp. 54-61 and cover page.

R. H. Ottewill, et al. "Nonionic Latices in Aqueous Media. Part 1. Preparation and Characterization of Polystyrene Latices" Colloid & Polymer Science, vol. 265, No. 9, Jan. 1, 1987, pp. 845-853.

Hans-Jürgen Butt et al., "Force Measurements with the Atomic Force Microscope: Technique, Interpretation and Applications" Surface Science Reports, vol. 59, Issues 1-6, Oct. 2005, pp. 1-152.

Robert J. Petersen, "Composite Reverse Osmosis and Nanofiltration Membranes" Journal of Membrane Science, vol. 83, Aug. 12, 1993, pp. 81-150.

* cited by examiner

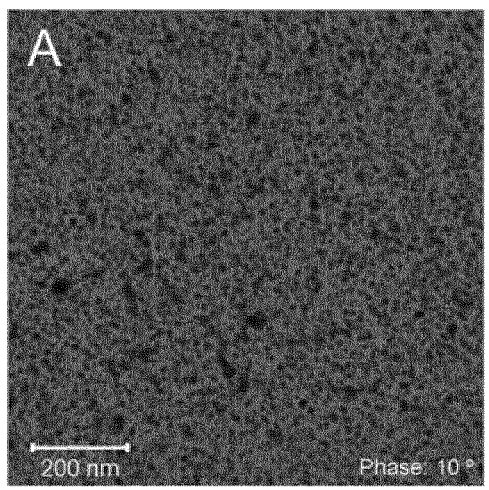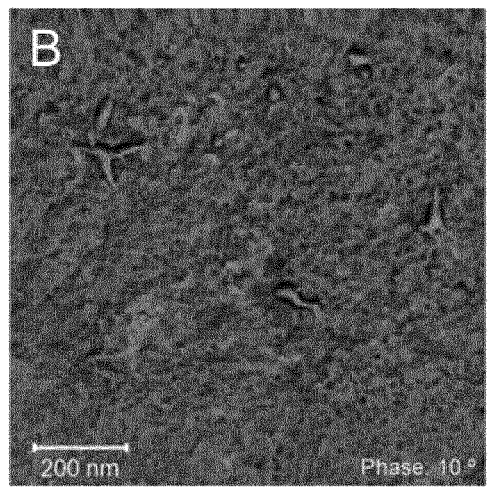

PROCESSES FOR REDUCING THE FOULING OF SURFACES

This application is a 371 of PCT/EP2016/057976, filed Apr. 12, 2016.

The present invention is directed to processes for reducing the fouling of a surface O, wherein an aqueous solution S of at least one polymer P comprising styrene and at least one ester E of (meth)acrylic acid and polyethylene oxide in a molar ratio of 0.05 to 50 is applied to said surface O, said surface O preferably being a membrane M, wherein said aqueous solution S comprises at least 50% by weight of water.

The present invention is further directed to polymers P comprising styrene and at least one (meth)acrylic ester of polyethylene oxide in a molar ratio of 0.3 to 50 and processes for their manufacture.

Different types of membranes play an increasingly important role in many fields of technology. In particular, methods for treating water rely more and more on membrane technology.

An important issue with the application of membranes is fouling. The problem of biofouling is pronounced in semipermeable membranes used for separation purposes like reverse osmosis, forward osmosis, nanofiltration, ultrafiltration and micro filtration. Membranes can be classified by their separation mechanism and/or pore sizes. For example, in water filtration applications ultrafiltration and microfiltration membranes (approximate pore diameter: 5-1000 nm) are used for wastewater treatment retaining organic and bioorganic material. In reverse osmosis and forward osmosis membranes, where monovalent ions and all components with larger diameter are rejected, the separation mechanism is based mainly on solution-diffusion mechanism.

In all applications where the ambient medium is an aqueous phase, potential blockage may occur by adhesion of microorganisms and biofilm formation. Consequently, a membrane is desired, which reduces biofilm formation and thus requires fewer cleaning cycles. This can for example be achieved through membranes with anti-adhesive or antifouling properties.

Thus, fouling is currently one of the major remaining problems for filtration membranes. Fouling causes deterioration of the membrane performance and shortens membrane lifetime, limiting further application of membrane technology. It is thus desirable to improve antifouling and antibacterial properties to membranes without impairing their separation characteristics in order to enhance their resistance.

Several approaches have been tried to solve the problem of fouling and biofouling and to prevent the formation and deposition of organic materials from organisms.

Previously applied approaches for reducing fouling on membranes focused for example on the following strategies to prevent biofouling of membranes: 1) blending of hydrophilic or amphiphilic copolymers for the manufacture of membranes, 2) surface modification of membranes and 3) bulk modification of membrane materials.

More recently, membranes were treated with amphiphilic comb polymers that reversibly form a thin layer on the surface of a membrane and thus reduce fouling.

Konradi et al., Macromol. Rapid Commun. 2012, 33, 1663-1676 discloses the antibiofouling efficiency of comb polymers on surfaces.

Kwon et al., Desalination and Water Treatment 2010, 15, 54-61 disclose PEG brushes on PEG acrylate homopolymers to decrease biofouling on membrane surfaces.

H. Choi et al., Desalination and Water Treatment 2012, 15, 183-189 disclose the coating of reverse osmosis membranes in dip coating processes from non-aqueous coating systems with Styrene-PEG acrylate comb copolymers obtained by free radical polymerization.

Y.-C. Chiang et al., Langmuir 2012, 28, 1399-1407 disclose dip coating of membranes made of PVDF with styrene-PEG methacrylate comb copolymers obtained by atom transfer radical polymerization (ATRP).

However, there is a need for improved solutions for reducing fouling on membranes.

The objective of the present invention was therefore to provide processes for reducing the fouling of membranes that are effective for reducing fouling, easy to carry out and that do not require modifying the membrane itself.

This objective was achieved by processes for reducing the fouling of a surface O, especially of a membrane M, wherein an aqueous solution S of at least one polymer P comprising styrene and at least one ester E of (meth)acrylic acid and polyethylene oxide in a molar ratio of 0.05 to 50 is applied to said membrane M.

The concept of a membrane is generally known in the art. In the context of this application, a membrane shall be understood to be a thin, semipermeable structure capable of separating two fluids or separating molecular and/or ionic components or particles from a liquid. A membrane acts as a selective barrier, allowing some particles, substances or chemicals to pass through while retaining others.

Membranes M can for example be microporous (average pore diameter smaller than 2 nm), mesoporous (average pore diameter from 2 nm to 50 nm) or macroporous (average pore diameter above 50 nm). Average pore diameters in this context are determined according to DIN 14652:2007-09 through correlation with the molecular weight cutoff of a membrane.

Membranes M or the separation layer of membranes M can be made of at least one inorganic material like a ceramic or at least one organic polymer.

Examples of inorganic materials are clays, silicates, silicon carbide, aluminium oxide, zirconium oxide or graphite. Such membranes made of inorganic materials are normally made by applying pressure or by sintering of finely ground powder. Membranes made of inorganic materials may be composite membranes comprising two, three or more layers.

In one embodiment, membranes M made from inorganic materials comprise a macroporous support layer, optionally an intermediate layer and a separation layer.

In a preferred embodiment, membranes M and/or the separation layer of membranes M comprise organic polymers, hereinafter referred to as polymers as the main components. A polymer shall be considered the main component of a membrane if it is comprised in said membrane or in the separation layer of said membrane in an amount of at least 50% by weight, preferably at least 60%, more preferably at least 70%, even more preferably at least 80% and particularly preferably at least 90% by weight.

Examples of suitable polymers are polyarylene ethers, polysulfone, polyethersulfone (PES), polyphenylenesulfone (PPSU), polyamide (PA), polyvinylalcohol (PVA), cellulose acetate (CA), cellulose diacetate, cellulose triacetate (CTA), CA-triacetate blend, cellulose ester, cellulose nitrate, regenerated cellulose, aromatic, aromatic/aliphatic or aliphatic polyamide, aromatic, aromatic/aliphatic or aliphatic polyimide, polybenzimidazole (PBI), polybenzimidazolone (PBIL), polyacrylonitrile (PAN), polyetheretherketone (PEEK), sulfonated polyetheretherketone (SPEEK), PAN-poly(vinyl chloride) copolymer (PAN-PVC), PAN-methallyl sulfonate copolymer, poly(dimethylphenylene oxide) (PPO), polycarbonate, polyester, polytetrafluroethylene PTFE, poly(vinylidene fluoride) (PVDF), polypropylene (PP), polyelectrolyte complexes, poly(methyl methacrylate) PMMA, polydimethylsiloxane (PDMS), aromatic, aromatic/aliphatic or aliphatic polyimide urethanes, aromatic, aromatic/aliphatic or aliphatic polyamidimides, crosslinked polyimides or mixtures thereof.

Preferably, membranes M comprise polysulfones, polyethersulfones (PES), polyamides (PA), polyvinylalcohols (PVA), Cellulose Acetate (CA), Cellulose Triacetate (CTA) Poly(vinylidene fluoride) (PVDF) or mixtures thereof as main components.

Suitable polyethersulfones can for example be obtained from BASF SE under the brand name Ultrason®.

Preferred polyarylene ether sulfones (A) are composed of units of the general formula I

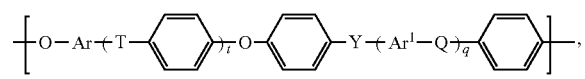

(I)

where the definitions of the symbols t, q, Q, T, Y, Ar and $Ar^1$ are as follows:

t, q: independently of one another 0, 1, 2, or 3,

Q, T, Y: independently of one another in each case a chemical bond or group selected from —O—, —S—, —SO$_2$—, S=O, C=O, —N=N—, and —CR$^a$R$^b$—, where R$^a$ and R$^b$ independently of one another are in each case a hydrogen atom or a $C_1$-$C_{12}$-alkyl, $C_1$-$C_{12}$-alkoxy, or $C_6$-$C_{18}$-aryl group, and where at least one of Q, T, and Y is —SO$_2$—, and Ar and $Ar^1$: independently of one another an arylene group having from 6 to 18 carbon atoms.

If, within the abovementioned preconditions, Q, T or Y is a chemical bond, this then means that the adjacent group on the left-hand side and the adjacent group on the right-hand side are present with direct linkage to one another via a chemical bond.

However, it is preferable that Q, T, and Y in formula I are selected independently of one another from —O— and —SO$_2$—, with the proviso that at least one of the group consisting of Q, T, and Y is —SO$_2$—.

If Q, T, or Y is —CR$^a$R$^b$—, R$^a$ and R$^b$ independently of one another are in each case a hydrogen atom or a $C_1$-$C_{12}$-alkyl, $C_1$-$C_{12}$-alkoxy, or $C_6$-$C_{18}$-aryl group.

Preferred $C_1$-$C_{12}$-alkyl groups comprise linear and branched, saturated alkyl groups having from 1 to 12 carbon atoms. The following moieties may be mentioned in particular: $C_1$-$C_6$-alkyl moiety, e.g. methyl, ethyl, n-propyl, isopropyl, n-butyl, sec-butyl, 2- or 3-methylpentyl, and longer chain moieties, e.g. unbranched heptyl, octyl, nonyl, decyl, undecyl, lauryl, and the singly branched or multi-branched analogs thereof.

Alkyl moieties that can be used in the abovementioned $C_1$-$C_{12}$-alkoxy groups that can be used are the alkyl groups defined at an earlier stage above having from 1 to 12 carbon atoms. Cycloalkyl moieties that can be used with preference in particular comprise $C_3$-$C_{12}$-cycloalkyl moieties, e.g. cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and $Ar^1$ are independently of one another a $C_6$-$C_{18}$-arylene group. On the basis of the starting materials described at a later stage below, it is preferable that Ar derives from an electron-rich aromatic substance that is very susceptible to electrophilic attack, preferably selected from the group consisting of hydroquinone, resorcinol, dihydroxynaphthalene, in particular 2,7-dihydroxynaphthalene, and 4,4'-bisphenol. $Ar^1$ is preferably an unsubstituted $C_6$- or $C_{12}$-arylene group.

Particular $C_6$-$C_{18}$-arylene groups Ar and $Ar^1$ that can be used are phenylene groups, e.g. 1,2-, 1,3-, and 1,4-phenylene, naphthylene groups, e.g. 1,6-, 1,7-, 2,6-, and 2,7-naphthylene, and also the arylene groups that derive from anthracene, from phenanthrene, and from naphthacene.

In the preferred embodiment according to formula I, it is preferable that Ar and $Ar^1$ are selected independently of one another from the group consisting of 1,4-phenylene, 1,3-phenylene, naphthylene, in particular 2,7-dihydroxynaphthalene, and 4,4'-bisphenylene.

Preferred polyarylene ether sulfones (A) are those which comprise at least one of the following repeat units Ia to Io:

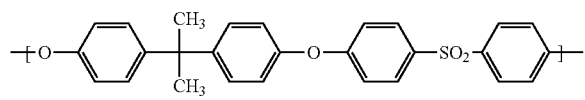

Ia

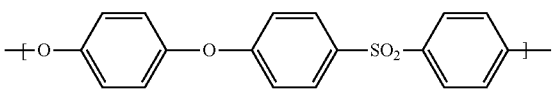

Ib

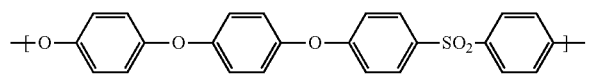

Ic

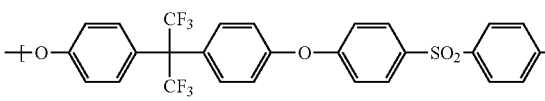

Id

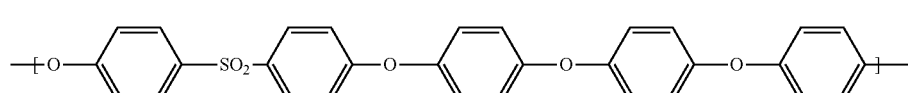

Ie

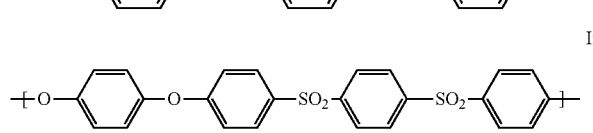

If

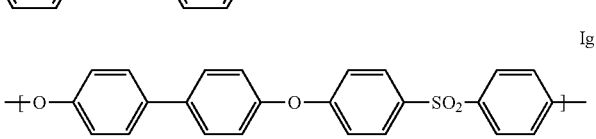

Ig

-continued

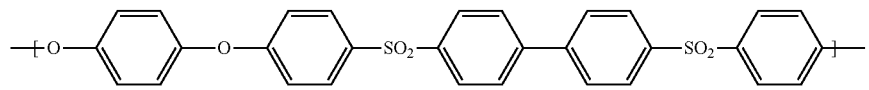

Ih

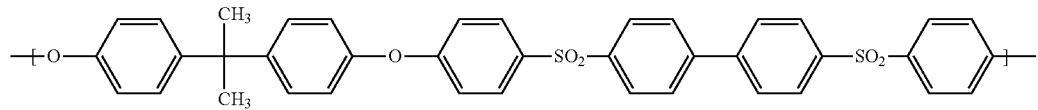

Ii

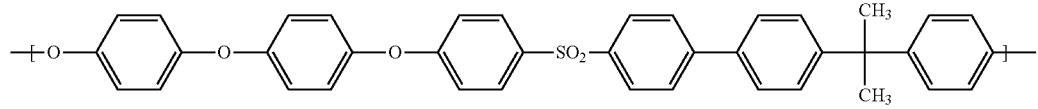

Ij

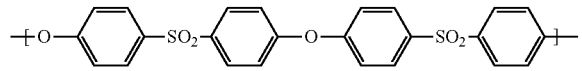

Ik

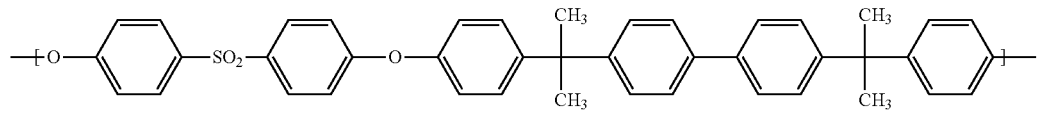

Il

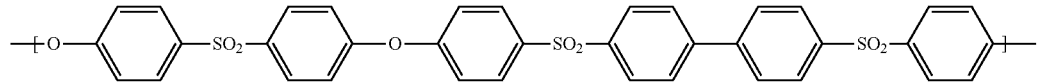

Im

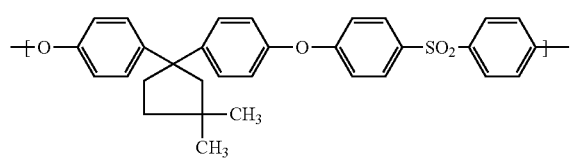

In                                                                                  Io

Other preferred units, in addition to the units Ia to Io that are preferably present, are those in which one or more 1,4-phenylene units deriving from hydroquinone have been replaced by 1,3-phenylene units deriving from resorcinol, or by naphthylene units deriving from dihydroxynaphthalene.

Particularly preferred units of the general formula I are the units Ia, Ig, and Ik. It is also particularly preferable that the polyarylene ether sulfones of component (A) are in essence composed of one type of unit of the general formula I, in particular of one unit selected from Ia, Ig, and Ik.

In one particularly preferred embodiment, Ar=1,4-phenylene, t=1, q=0, T is a chemical bond, and Y=SO$_2$. Particularly preferred polyarylene ether sulfones (A) composed of the abovementioned repeat unit are termed polyphenylene sulfone (PPSU) (formula Ig).

In another particularly preferred embodiment, Ar=1,4-phenylene, t=1, q=0, T=C(CH$_3$)$_2$, and Y=SO$_2$. Particularly preferred polyarylene ether sulfones (A) composed of the abovementioned repeat unit are termed polysulfone (PSU) (formula Ia).

In another particularly preferred embodiment, Ar=1,4-phenylene, t=1, q=0, T=Y=SO$_2$. Particularly preferred polyarylene ether sulfones (A) composed of the abovementioned repeat unit are termed polyether sulfone (PESU or PES) (formula Ik). This embodiment is very particularly preferred.

For the purposes of the present invention, abbreviations such as PPSU, PESU, and PSU are in accordance with DIN EN ISO 1043-1:2001.

The weight-average molar masses M$_w$ of the polyarylene ether sulfones (A) of the present invention are preferably from 10 000 to 150 000 g/mol, in particular from 15 000 to 120 000 g/mol, particularly preferably from 18 000 to 100 000 g/mol, determined by means of gel permeation chromatography in dimethylacetamide as solvent against narrowly-distributed polymethyl methacrylate as standard.

In one embodiment of the invention, suitable polyarylene ether sulfones, particularly polysulfones, polyphenylenesulfones or polyethersulfones comprise sulfonic acid, carboxylic acid, amino and/or hydroxy groups on some or all of the aromatic rings in the polymer.

Production processes that lead to the abovementioned polyarylene ethers are known to the person skilled in the art and are described by way of example in Herman F. Mark, "Encyclopedia of Polymer Science and Technology", third edition, volume 4, 2003, chapter "Polysulfones" pages 2 to 8, and also in Hans R. Kricheldorf, "Aromatic Polyethers" in: Handbook of Polymer Synthesis, second edition, 2005, pages 427 to 443.

Membranes M can for example be membranes suitable as reverse osmosis (RO) membranes, forward osmosis (FO) membranes, nanofiltration (NF) membranes, ultrafiltration (UF) membranes or microfiltration (MF) membranes. These membrane types are generally known in the art.

Membranes M are for example those disclosed in US 2011/0027599 in [0021] to [0169]; US 2008/0237126 in col 4, ln 36 to col 6, ln 3; US 2010/0224555 in [0147] to [0490]; US 2010/0062156 in [0058] to [0225]; US 2011/0005997 in [0045] to [0390], US 2009/0272692 in [0019] to [0073], US 2012/0285890 in [0016] to [0043]; these documents are incorporated herein by reference.

Further suitable membranes M are for example those disclosed in U.S. Pat. No. 6,787,216, col. 2, ln 54 to col 6, ln 19; U.S. Pat. No. 6,454,943, col. 3; ln 25 to col. 6, ln 12; and WO 2006/012920, p. 3, last paragraph to p. 10, first paragraph.

FO membranes are normally suitable for treatment of seawater, brackish water, sewage or sludge streams. Thereby pure water is removed from those streams through a FO membrane into a so-called draw solution on the backside of the membrane having a high osmotic pressure. Typically, FO type membranes, similar as RO membranes separate liquid mixtures via a solution diffusion mechanism, where only water can pass the membrane whereas monovalent ions and larger components are rejected.

In a preferred embodiment, FO membranes M are thin film composite (TFC) FO membranes. Preparation methods and use of thin film composite membranes are principally known and, for example described by R. J. Petersen in Journal of Membrane Science 83 (1993) 81-150.

In a further preferred embodiment, FO membranes M comprise a support layer, a separation layer and optionally a protective layer. Said protective layer can be considered an additional coating to smoothen and/or hydrophilize the surface.

Said fabric layer can for example have a thickness of 10 to 500 µm. Said fabric layer can for example be a woven or nonwoven, for example a polyester nonwoven.

Said support layer of a TFC FO membrane M normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, polyphenylenesulfone (PPSU), PVDF, polyimide, polyimideurethane or cellulose acetate. Nano particles such as zeolites, particularly zeolite LTA, may be comprised in said support membrane. This can for example be achieved by including such nano particles in the dope solution for the preparation of said support layer.

Said separation layer can for example have a thickness of 0.05 to 1 µm, preferably 0.1 to 0.5 µm, more preferably 0.15 to 0.3 µm. Preferably, said separation layer can for example comprise polyamide or cellulose acetate as the main component.

Optionally, TFC FO membranes M can comprise a protective layer with a thickness of 30-500 nm, preferably 100-300 nm. Said protective layer can for example comprise polyvinylalcohol (PVA) as the main component. In one embodiment, the protective layer comprises a halamine like chloramine.

In one preferred embodiment, membranes M are TFC FO membranes comprising a support layer comprising polyethersulfone as main component, a separation layer comprising polyamide as main component and optionally a protective layer comprising polyvinylalcohol as the main component.

In a preferred embodiment FO membranes M comprise a separation layer obtained from the condensation of a polyamine and a polyfunctional acyl halide. Said separation layer can for example be obtained in an interfacial polymerization process.

RO membranes are normally suitable for removing molecules and ions, in particular monovalent ions. Typically, RO membranes separate mixtures based on a solution/diffusion mechanism.

In a preferred embodiment, membranes M are thin film composite (TFC) RO membranes. Preparation methods and use of thin film composite membranes are principally known and, for example described by R. J. Petersen in Journal of Membrane Science 83 (1993) 81-150.

In a further preferred embodiment, RO membranes M comprise a fabric layer, a support layer, a separation layer and optionally a protective layer. Said protective layer can be considered an additional coating to smoothen and/or hydrophilize the surface.

Said fabric layer can for example have a thickness of 10 to 500 µm. Said fabric layer can for example be a woven or nonwoven, for example a polyester nonwoven.

Said support layer of a TFC RO membrane normally comprises pores with an average pore diameter of for example 0.5 to 100 nm, preferably 1 to 40 nm, more preferably 5 to 20 nm. Said support layer can for example have a thickness of 5 to 1000 µm, preferably 10 to 200 µm. Said support layer may for example comprise a main component a polysulfone, polyethersulfone, PVDF, polyimide, polyimideurethane or cellulose acetate. Nano particles such as zeolites, particularly zeolite LTA, may be comprised in said support membrane. This can for example be achieved by including such nano particles in the dope solution for the preparation of said support layer.

Said separation layer can for example have a thickness of 0.02 to 1 µm, preferably 0.03 to 0.5 µm, more preferably 0.05 to 0.3 µm. Preferably, said separation layer can for example comprise polyamide or cellulose acetate as the main component.

Optionally, TFC RO membranes M can comprise a protective layer with a thickness of 5 to 500 preferable 10 to 300 nm. Said protective layer can for example comprise polyvinylalcohol (PVA) as the main component. In one embodiment, the protective layer comprises a halamine like chloramine.

In one preferred embodiment, membranes M are TFC RO membranes comprising a nonwoven polyester fabric, a support layer comprising polyethersulfone as main component, a separation layer comprising polyamide as main component and optionally a protective layer comprising polyvinylalcohol as the main component.

In a preferred embodiment RO membranes M comprise a separation layer obtained from the condensation of a polyamine and a polyfunctional acyl halide. Said separation layer can for example be obtained in an interfacial polymerization process.

Suitable polyamine monomers can have primary or secondary amino groups and can be aromatic (e.g. a diaminobenzene, a triaminobenzene, m-phenylenediamine, p-phenylenediamine, 1, 3, 5-triaminobenzene, 1,3,4-triaminobenzene, 3, 5-diaminobenzoic acid, 2, 4-diaminotoluene, 2, 4-diaminoanisole, and xylylenediamine) or aliphatic (e.g. ethylenediamine, propylenediamine, piperazine, and tris(2-diaminoethyl)amine).

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

In one embodiment of the invention, a separation layer of polyamide is made from the reaction of an aqueous solution of meta-phenylene diamine (MPD) with a solution of trimesoyl chloride (TMC) in an apolar solvent.

In another embodiment of the invention, the separation layer and optionally other layers of the membrane contain nanoparticles. Suitable nanoparticles normally have an average particle size of 1 to 1000 nm, preferably 2 to 100 nm, determined by dynamic light scattering. Suitable nanoparticles can for example be zeolites, silica, silicates or aluminium oxide. Examples of suitable nanoparticles include Aluminite, Alunite, Ammonia Alum, Altauxite, Apjohnite, Basaluminite, Batavite, Bauxite, Beideilite, Boehmite, Cadwaladerite, Cardenite, Chalcoalumite, Chiolite, Chloraluminite, Cryolite, Dawsonite, Diaspore, Dickite, Gearksutite, Gibbsite, Hailoysite, Hydrobasaluminite, Hydrocalumite, Hydrotalcite, Illite, Kalinite, Kaolinite, Mellite, Montmorilonite, Natroalunite, Nontronite, Pachnolite, Prehnite, Prosopite, Ralstonite, Ransomite, Saponite, Thomsenolite, Weberite, Woodhouseite, and Zincaluminit, kehoeite, pahasapaite and tiptopite; and the silicates: hsianghualite, lovdarite, viseite, partheite, prehnite, roggianite, apophyllite, gyrolite, maricopaite, okenite, tacharanite and tobermorite.

Nanoparticles may also include a metallic species such as gold, silver, copper, zinc, titanium, iron, aluminum, zirconium, indium, tin, magnesium, or calcium or an alloy thereof or an oxide thereof or a mixture thereof. They can also be a nonmetallic species such as Si3N4, SiC, BN, B4C, or TiC or an alloy thereof or a mixture thereof. They can be a carbon-based species such as graphite, carbon glass, a carbon cluster of at least C~, buckminsterfullerene, a higher fullerene, a carbon nanotube, a carbon nanoparticle, or a mixture thereof.

In yet another embodiment, the separation layer and optionally other layers of the membrane contain zeolites, zeolite precursors, amorphous aluminosilicates or metal organic frame works (MOFs) any preferred MOFs. Preferred zeolites include zeolite LTA, RHO, PAU, and KFI. LTA is especially preferred.

Preferably, the nanoparticles other than vanadium pentoxide comprised in the membrane have a polydispersity of less than 3.

In another embodiment of the invention the separation layer of the membrane M contains a further additive increasing the permeability of the RO membrane M. Said further additive can for example be a metal salt of a beta-diketonate compound, in particular an acetoacetonate and/or an at least partially fluorinated beta-diketonate compound.

NF membranes are normally especially suitable for removing separate multivalent ions and large monovalent ions. Typically, NF membranes function through a solution/diffusion or/and filtration-based mechanism.

NF membranes are normally used in cross filtration processes.

NF membranes M can for example comprise as the main component polyarylene ether, polysulfone, polyethersulfones (PES), polyphenylensulfone (PPSU), polyamides (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), polyetheretherketone (PEEK), sulfonated polyetheretherketone (SPEEK), Polyacrylonitrile (PAN), PAN-poly(vinyl chloride) copolymer (PAN-PVC), PAN-methallyl sulfonate copolymer, Polysulfone, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or mixtures thereof. In a preferred embodiment, said main components of NF membranes are positively or negatively charged.

Nanofiltration membranes M often comprise charged polymers comprising sulfonic acid groups, carboxylic acid groups and/or ammonium groups.

Preferably, NF membranes M comprise as the main component polyamides, polyimides or polyimide urethanes, Polyetheretherketone (PEEK) or sulfonated polyetheretherketone (SPEEK).

UF membranes are normally suitable for removing suspended solid particles and solutes of high molecular weight, for example above 1000 Da. In particular, UF membranes are normally suitable for removing bacteria and viruses.

UF membranes M normally have an average pore diameter of 0.5 nm to 50 nm, preferably 1 to 40 nm, more preferably 5 to 20 nm.

UF membranes M can for example comprise as main component a polyarylene ether, polysulfone, polyethersulfone (PES), polyphenylenesulfone (PPSU), polyamides (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Polysulfone, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or mixtures thereof.

Preferably, UF membranes M comprise as main component polysulfone, polyethersulfone, polyphenylenesulfone (PPSU), PVDF, polyimide, polyamidimide, crosslinked polyimides, polyimide urethanes or mixtures thereof.

In one embodiment, UF membranes M comprise further additives like polyvinyl pyrrolidones.

In one embodiment, UF membranes M comprise further additives like block copolymers of polyarylene sulfones and alkyleneoxides like polyethyleneoxide.

In a preferred embodiment, UF membranes M comprise as major components polysulfones, polyphenylenesulfones or polyethersulfones in combination with further additives like polyvinylpyrrolidone.

In one preferred embodiment, UF membranes M comprise 80 to 50% by weight of polyethersulfone and 20 to 50% by weight of polyvinylpyrrolidone.

In another embodiment UF membranes M comprise 95 to 80% by weight of polyethersulfone and 5 to 15% by weight of polyvinylpyrrolidone.

In another embodiment UF membranes M comprise 99.9 to 80% by weight of polyethersulfone and 0.1 to 20% by weight of polyvinylpyrrolidone.

In one embodiment of the invention, UF membranes M are present as spiral wound membranes.

In another embodiment of the invention, UF membranes M are present as tubular membranes.

In another embodiment of the invention, UF membranes M are present as flat sheet membranes.

In another embodiment of the invention, UF membranes M are present as hollow fiber membranes.

In yet another embodiment of the invention, UF membranes M are present as single bore hollow fiber membranes.

In yet another embodiment of the invention, UF membranes M are present as multi bore hollow fiber membranes.

MF membranes are normally suitable for removing particles with a particle size of 0.1 µm and above.

MF membranes M normally have an average pore diameter of 0.1 µm to 10 µm, preferably 1.0 µm to 5 µm.

Microfiltration can use a pressurized system but it does not need to include pressure.

MF membranes M can be hollow fibers, flat sheet, tubular, spiral wound, hollow fine fiber or track etched. They are porous and allow water, monovalent species ($Na^+$, $Cl^-$), dissolved organic matter, small colloids and viruses through while retaining particles, sediment, algae or large bacteria.

Microfiltration systems are designed to remove suspended solids down to 0.1 micrometres in size, in a feed solution with up to 2-3% in concentration.

MF membranes M can for example comprise as the main component polyarylene ether, polysulfone, polyethersulfone (PES), polyphenylenesulfone (PPSU), polyamides (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Polysulfone, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or mixtures thereof.

According to the invention, membranes M are treated with an aqueous solution S of at least one polymer P.

"Aqueous" in this context shall mean that said polymer P is dissolved in a solvent or solvent mixture that comprises at least 50% by weight, preferably at least 70% by weight, more preferably at least 90% by weight and particularly preferably at least 99% by weight of water. In a preferred embodiment, the solvent in which said at least one polymer P is dissolved is water.

An "aqueous solution" of at least one polymer P shall mean that said at least one polymer P is completely or partly dissolved in an aqueous solvent. In a preferred embodiment, said aqueous solution S is a clear solution without any turbidity. In another embodiment, said aqueous solution S comprises polymer P at least partly in dissolved state but shows turbidity.

Polymer P comprises styrene and at least one ester E of (meth)acrylic acid and polyethylene oxide. In the context of this application, this shall mean that polymer P comprises these monomers in polymerized form.

Polymer P comprises styrene and ester E in a molar ratio from 0.05 to 50 (meaning that the molar ratio of styrene to ester E is 0.05:1 to 50:1). Preferably, the molar ratio of styrene to ester E in polymer P is 0.2:1 to 15:1, more preferably 0.3:1 to 10:1 and especially preferably 0.5:1 to 2:1.

In one embodiment, ester E is an ester of acrylic acid and polyethylene oxide.

In one embodiment, ester E is an ester of methacrylic acid and polyethylene oxide.

In a less preferred embodiment said polyethylene oxide is esterified on one end with (meth)acrylic acid and bears a hydroxy group on the other end.

In a preferred embodiment said polyethylene oxide is esterified on one end with (meth)acrylic acid and has been functionalized on the other end, for example by etherification with an alkyl group like methyl, ethyl, propyl or butyl, preferably methyl.

Thus, in one embodiment, ester E is an ester of acrylic acid and polyethylene glycol mono alkyl ether.

In one embodiment, ester E is an ester of methacrylic acid and polyethylene glycol mono alkyl ether.

Polyethylene oxide in this context shall mean a polyalkylene oxide that consists essentially of oxyethylene units and optionally a terminal alkyl ether group. In particular, polyethylene oxide comprises less than 10 mol % of oxyalkylene units different from oxyethylene. Preferably, polyethylene oxide as used in this context comprises less than 5 mol %, more preferably less than 1 mol % of oxyalkylene units different from oxyethylene. In an especially preferred embodiment polyethylene oxide as used herein consists of oxyethylene units and a terminal alkyl ether group. Polyethylene oxide is in many cases prepared by ring opening polymerization of ethylene oxide using alcohols like methanol, ethanol, n/iso-propanol or n/sek/tert-butanol as a starter.

Preferably, ester E has an average molar mass Mn of 300 to 10.000 g/mol, more preferably 500 to 10,000 and even more preferably 800 to 10,000 g/mol, especially preferably 1,000 to 10,000 g/mol and particularly preferably 1500 to 10,000 g/mol.

In another embodiment, ester E has an average molar mass Mn of 300 to 8,000 g/mol, more preferably 300 to 5,000 and even more preferably 300 to 3,000 g/mol and especially preferably 300 to 2000 g/mol.

In especially preferred embodiments, ester E has an average molar mass Mn of 500 to 8000 g/mol, 1000 to 5000 g/mol, 800 to 3000 g/mol, 1000 to 3000 g/mol, 800 to 2500 g/mol or 1500 to 2000 g/mol.

Polymer P preferably has an average molar mass Mn of 5,000 to 100,000 g/mol. (All values for the average molar mass Mn given in this application are determined by gel permeation chromatography (GPC) using the method as described in the experimental section of this application).

Polymer P is normally prepared by radical polymerization of styrene and ester E.

In one preferred embodiment, polymer P is prepared by solution polymerization. "Solution polymerization" means that all starting materials are at least partly dissolved in the same solvent and that the polymerization reaction takes place in homogenous phase, without additional surfactants having to be present. In one preferred embodiment, styrene and ester E are dissolved in suitable solvents like alcohols like methanol, ethanol, 1-propanol, 2-propanol, butanol or mixtures thereof and are then polymerized. Preferably, such solvents for the solution polymerization of styrene and ester E comprise at least 50% by weight, preferably 70% and more preferably 80% by weight of alcohols like methanol, ethanol, 1-propanol, 2-propanol, butanol or mixtures thereof. Preferably, such solvents for the solution polymerization of styrene and ester E comprise 20% by weight or less, preferably 10% by weight or less of water. Unpolar solvents like hydrocarbons (for example aromatic solvents like toluene) are in principle also possible solvents for such solution polymerizations. However, they yield polymers with different properties. In particular, the antifouling properties of such polymers on membranes are not as beneficial as from alcohols. Thus, it is preferred to have such hydrocarbons like toluene present in the polymerization solvent in amounts of 20% by weight and below, preferably of 10% by weight and below based on the solvent mixture.

Said radical polymerization can in one embodiment be initiated by oxidative radical starters like organic peroxides (e.g. sodium persulfate, potassium persulfate, metachloroperbenzoic acid). In another embodiment radical polymerization is initiated by azo starters like azo-bisisobutyrodinitrile or 2,2'-Azobis(2-methylbutyronitrile) (V-59, Wako pure chemical industries, Ltd).

Polymers P obtained by solution polymerization yield aqueous solutions that are very effective with respect to the reduction of fouling on membranes. In many cases, Polymers P obtained by solution polymerization yield aqueous solutions that are clear and do not show any turbidity at room temperature.

In a less preferred embodiment, polymer P is prepared by emulsion polymerization.

As it turned out quite unexpectedly, polymers that are obtained by emulsion polymerization are less effective in preventing fouling on membranes than polymers obtained by solution polymerization.

Polymer P is preferably a statistical copolymer in which styrene and ester E are distributed statistically.

Another aspect of the invention are new polymers with the characteristics as described above for polymer P.

To reduce the fouling of a surface O, preferably of a membrane M, said surface O, preferably membrane M is treated with an aqueous solution S of polymer P. Said aqueous solution S normally comprises 0.001 to 1% by weight of polymer P based on the aqueous solution S, preferably 0.01 to 0.5% by weight and even more preferably 0.05 to 0.3% by weight.

Through the application of aqueous solution S onto membrane M, the fouling and/or biofouling of said membrane M is reduced. Normally it will be advantageous to apply an aqueous solution S to a membrane periodically wherein the intervals between such applications of aqueous solution S to said membrane can be either identical or similar between two applications or can be different.

In many cases aqueous solution S is applied to membrane M with intervals from 1 day to 24 months. Preferably, the intervals between the applications of aqueous solution S onto membrane M are from 2 days to 12 months, more preferably from 3 days to 6 months, even more preferably 7 days to 3 months. In one embodiment, aqueous solution S is applied to membrane M with intervals from 14 days to 1 month.

In one embodiment, the application of aqueous solution S onto membrane M is coordinated with other treatment or cleaning steps of membrane M. For example, it may be advantageous to apply aqueous solution S onto membrane M after membrane M has been subjected to a chemically enhanced backwash step (CEB).

CEB means that a membrane is subjected to backwashing with certain cleaning additives being added to the backwash water like hypochlorite, surfactants, peroxide or alkaline and acidic solutions such as sodium hydroxide and hydrochloric acid solutions. CEB is normally carried out in intervals of one day to one month.

Another aspect of the present invention are surfaces O like membranes M that comprise on the surface a layer of at least one polymer P.

In another embodiment, membranes M comprise a self-assembled monolayer of at least one polymer P. A "self-assembled monolayer" means a molecular assembly formed spontaneously on a surface by adsorption and organized into more or less large ordered domains. Self-assembled monolayers normally have a thickness that correlates with the size of the individual molecules adsorbed to that surface and that is normally smaller than 100 nm. Such self-assembled monolayers form spontaneously on surface O without any further process step being required. Self-assembled monolayers can for example be characterized by atomic force microscopy (AFM) or X-ray photoelectron spectroscopy (XPS).

Processes according to the invention reduce fouling and/or biofouling of surfaces O like membranes M. Thus, the efficiency of membranes M is increased. Surfaces O treated according to the invention are also easier to clean.

Processes according to the invention are easy to carry out and do not require complex equipment. In particular are carried out in aqueous media and do not require the use of organic solvents. Processes according to the invention are environmentally friendly, do not involve unpleasant odor, are unproblematic with respect to toxicology and working hygiene and are economical to carry out. Processes according to the invention use only small amounts of polymer P. Processes according to the invention can be easily applied to complex surface structures or filtration modules or filtration systems by washing/backwashing/flushing of such filtration modules or systems with solutions S. Processes according to the invention alter the properties of surfaces O like Membranes M without irreversibly changing the nature of said surface O or membrane M.

Processes according to the invention make use of polymers that can be made quite economically and environmentally friendly.

Processes according to the invention reduce the number of backwash and CEB cycles required to maintain a high level of permeability and the flux at constant transmembrane pressure', i.e. the effectiveness of a membrane.

Processes according to the invention reduce the amount of chemicals required in CEB. Thus, due to the potentially aggressive nature of such chemicals, the lifetime of the membranes is increased.

Processes according to the invention can be used for a plurality of applications.

In a preferred embodiment, processes according to the invention are used in processes for the treatment of seawater, brackish water, fluvial water, surface water or drinking water.

In one preferred embodiment of the invention, membranes M in processes according to the invention, are especially RO, FO or NF membranes that are used for the desalination of seawater or brackish water.

In one embodiment, membranes M in processes according to the invention are especially RO, FO or NF membranes that are used for the desalination of water with a particularly high salt content of for example 3 to 8% by weight. For example, processes according to the invention are suitable for the cleaning and/or desalination of water from mining and oil/gas production and fracking processes with a salt content of 3 to 8% by weight, to obtain a higher yield in these applications.

In one embodiment, membranes M in processes according to the invention are especially RO, FO or NF membranes that are used for the desalination of water salt content of for example 0.1 to 3% by weight. For example, processes according to the invention are suitable for the cleaning and/or desalination of water from mining and oil/gas production and fracking processes with a salt content of 0.1 to 3% by weight.

In one embodiment, processes according to the invention use different types of membranes M together in hybrid systems combining for example RO and FO membranes, RO and UF membranes, RO and NF membranes, RO and NF and UF membranes, NF and UF membranes.

In another preferred embodiment, processes according to the invention use membranes M, particularly NF, UF or MF membranes, in a water treatment step prior to the desalination of seawater or brackish water.

In another preferred embodiment processes according to the invention use membranes M, particularly NF, UF or MF membranes, for the treatment of industrial or municipal waste water.

In one embodiment, processes according to the invention use membranes M, particularly RO and/or FO membranes, and can be used in the processing of food and beverages, for example for concentrating, desalting or dewatering food liquids (such as fruit juices), for the production of whey protein powders and for the concentration of milk, the UF permeate from making of whey powder, which contains lactose, can be concentrated by RO, wine processing, providing water for car washing, making maple syrup, during electrochemical production of hydrogen to prevent formation of minerals on electrode surface, for supplying water to reef aquaria.

In one embodiment, processes according to the invention use membranes M, particularly UF and MF membranes, and can be used in medical applications like in dialysis and other blood treatments, in the processing of food and beverages, milk concentration for making cheese, processing of proteins, desalting and solvent-exchange of proteins, fractionation of proteins, clarification of fruit juice, wine and beer filtration, recovery of biotechnologically produced substances such as vaccines and antibiotics, enzymes, yeasts, organic acids, amino acids, vitamins and carotenoids, polysaccharides and sugar alcohols, bio-ethanol, bio-polymers, pharmaceutical intermediates, etc. from fermentation broth, laboratory grade water purification, drinking water disinfection (including removal of viruses), removal of endocrines and pesticides combined with suspended activated carbon pretreatment.

In one embodiment, processes according to the invention use membranes M, particularly RO, FO, NF membranes, and can be used for rehabilitation of mines, homogeneous catalyst recovery, desalting reaction processes.

In one embodiment, processes according to the invention use membranes M, particularly NF membranes, and can be used for separating divalent ions or heavy and/or radioactive metal ions, for example in mining applications, homogeneous catalyst recovery, desalting reaction processes.

In one embodiment, processes according to the invention can be used in the processing of milk or dairy products. In one embodiment, processes according to the invention involve the treatment of the surface of machines used for processing milk or dairy products. In another embodiment, processes according to the invention involve the treatment of filtration equipment like membranes used for processing milk or dairy products.

EXAMPLES

Abbreviations used:
w. % % by weight
PEGMA polyethylene glycol methacrylic ester
PEGMA2000 polyethylene glycol methacrylic ester with an average molecular mass Mn of 2000 g/mol
PEGMA1000 polyethylene glycol methacrylic ester with an average molecular mass Mn of 1000 g/mol
PEGMA550 polyethylene glycol methacrylic ester with an average molecular mass Mn of 550 g/mol
Sty styrene
PEGA polyethylene glycol acrylic ester
ATRP atom transfer radical polymerization
Mn average molecular weight
SEC size exclusion chromatography
QCM quartz crystal microbalance
PES polyethersulfone
PVDF polyvinylidene difluoride
PA polyamide
PS polystyrene
HEPES 4-(2-hydroxyethyl)-1-piperazineethanesulfonic acid
UF ultrafiltration
PWP pure water permeability
$RF_{coating}$ flux recovery after coating
$FR_{fouling}$ flux recovery after fouling
h hour(s)
s second(s)
MWCO Molecular Weight Cut-Off
Number average molecular weights Mn were determined by gel permeation chromatography (Size Exclusion Chromatography) as follows:

*Size Exclusion Chromatography was completed using a mixed bed scouting column for water soluble linear polymers, TSKgel GMPWxl from Tosoh Bioscience LLC, at 35° C. The eluent used was 0.01 M phosphate buffer at pH=7.4 containing 0.01 M sodium azide.

The polymer used as 1.5 mg/mL concentrated solution in the eluent. Before injection in a 100 μL injection loop, all samples were filtered through a Millipore IC Millex-LG (0.2 μm) filter. The calibration was carried out with narrow polyacrylic acid sodium salt samples from PSS Polymer Standards Service having molecular weights between 900 to 1100000 g/mol, as well as using polyacrylic acid samples from American Polymer Standards Corporation with molecular weights of 1770 g/mol and 900 g/mol. Values outside this interval were extrapolated. For Mn calculations 3800 g/mol was fixed as the lower limit.

When no other solvent is given in the experimental procedure, such experiments were carried out in water.

Example 1: Preparation of Copolymer X1
(Sty:PEGMA2000=1:4, Numbers in Header Give the Approximate Molar Ratio of the Components Used)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 1.3 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 10900 g/mol. A clear solution was obtained. After drying a white powder was recovered.

Example 2: Preparation of Copolymer X2 (Sty:PEGMA2000=1:1)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 5.2 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 11200 g/mol. A clear solution was obtained. After drying a white powder was recovered.

Example 3: Preparation of Copolymer X3 (Sty:PEGMA2000=4:1)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 20.8 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 25900 g/mol. A translucent solution was obtained. After drying, a white powder was recovered.

Example 4: Preparation of Copolymer X4 (Sty:PEGMA2000=10:1)

400.4 parts by weight of 1-propanol, 208 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 52 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 50700 g/mol. A turbid solution was obtained. After drying, a white powder was recovered.

Example 5: Preparation of Copolymer X5 (Sty:PEGMA2000=20:1)

400.4 parts by weight of 1-propanol, 208 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol and added in the reactor at 70° C. within one hour. Additionally, 104 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 29100 g/mol. A turbid solution was obtained. After drying, a white powder was recovered.

Example 6: Preparation of Copolymer X6 (Sty:PEGMA1000=1:1)

400.4 parts by weight of 1-propanol, 208 parts by weight of PEGMA1000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 10.4 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 8830 g/mol. A clear solution was obtained. After drying, a white powder was recovered.

Example 7: Preparation of Copolymer X7 (Sty:PEGMA550=1:1)

400.4 parts by weight of 1-propanol, 220 parts by weight of PEGMA550 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 20.8 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The reaction mixture was kept at 70° C. for another 2 hours, before being submitted to purification by water steam distillation. Mn found by SEC was 39100 g/mol. A clear solution was obtained. After drying, a clear viscous liquid was recovered.

Example 8: Preparation of Copolymer X8 (Sty:PEGMA1000=1:4)

400.4 parts by weight of 1-propanol, 200 parts by weight of PEGMA1000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 2.6 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. A clear solution was obtained. After drying, a white powder was recovered.

Example 9: Preparation of Copolymer X9 (Sty:PEGMA550=1:15)

400.4 parts by weight of 1-propanol, 200 parts by weight of PEGMA550 50 wt % water solution and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 1.3 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The reaction mixture was kept at 70° C. for another 2 hours, before being submitted to purification by water steam distillation. A clear solution was obtained. After drying, a transparent viscous liquid was recovered.

Example 10: Preparation of Copolymer X10 (Sty:PEGMA2000=1:1) Via Emulsion Polymerization A solution of 0.7 parts by weight of styrene, 28 parts by weight of PEGMA2000 and 1.14 parts by weight of a universally applicable, non-ionic emulsifier for the manufacture of oil in water emulsions based on polyoxyethylene alkyl ethers prepared by the condensation of linear fatty alcohols derived from vegetable sources with ethylene oxide (Emulgin B2 PH) in 440 parts by weight of water were heated to 65° C. At 65° C. 0.5 parts by weight of sodium persulfate dissolved in 14 parts by weight of water were added to the reaction mixture while the temperature was increased to 80° C. at the same time. 10 minutes later 6.3 parts by weight of styrene, 25.2 parts by weight of PEGMA2000 and 1.8 parts by weight of Emulgin B2 PH in 180 parts by weight of water were added during 2.5 hours. At the same time, 1 part by weight of sodium persulfate dissolved in 80 parts by weight of water were added during 2.5 hours. The reaction mixture was kept at 80° C. for 5 hours. Then the reaction mixture was cooled to room temperature. A milky emulsion was obtained.

Example 11: Preparation of Copolymer X11 (Sty:PEGMA2000=1:1) Via Emulsion Polymerization without Emulsifier The experiment was carried out following the modified literature procedure described by A. Brindley S. S. Davis, M. C. Davies, J. F. Watts in the Journal of Colloid and Interface Science 1995, 171, 150-161. In a reactor 5.2 parts by weight of styrene were stirred (300 rpm) in 880 parts by weight of deionized water at 70° C. under nitrogen atmosphere. 216 parts by weight of PEGMA2000 50 wt % aqueous solution and 0.5 parts by weight of sodium persulfate were simultaneously added at 70° C., then the reaction medium was further stirred during 24 hours at 70° C., before being submitted to purification by water steam distillation. Mn found by SEC was 43100 g/mol.

Example 11A: Preparation of Copolymer X11A (Sty:PEGMA2000=1:1) Via Solution Polymerization in Toluene 300 parts by weight of toluene, 126 parts by weight of lyophilized (freeze dried) PEGMA2000 and 6.3 parts by weight of styrene were mixed under nitrogen and heated to 80° C. Afterwards, 2.65 parts by weight of 2,2'-azobis(2-methylbutyronitrile) (Wako V 59, Wako Chemicals GmbH, Germany) dissolved in 15 parts by weight of toluene were added to the reactor at 75° C. The reaction mixture was kept at 80° C. for 24 hours. A clear solution was obtained. After cooling to room temperature, the polymer was purified by precipitation in 2-Methoxy-2-methylpropane (1500 mL MTBE). After drying in a vacuum oven at 40° C. overnight a white powder was obtained.

Example 12: Preparation of Copolymer X12 in Isopropanol (Sty:PEGMA2000=1:1)

400.4 parts by weight of isopropanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of isopropanol were added in the reactor at 70° C. within one hour. Additionally, 5.2 parts by weight of styrene in 180.7 parts by weight of isopropanol and 2 parts by weight of Wako V 59 in 100 parts by weight of isopropanol were successively added within the next 2 hours. Thereafter, 100 parts by weight of isopropanol and 2 parts by weight of Wako V 59 were added during 6 h. The total reaction mixture was kept at 70° C. for another 2 hours, before being submitted to purification by water steam distillation. Mn found by SEC was 11300 g/mol. After drying, a white powder was recovered.

Example 13: Preparation of Copolymer X13 in Ethanol (Sty:PEGMA2000=1:1)

400.4 parts by weight of ethanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of ethanol were added in the reactor at 70° C. within one hour. Additionally, 5.2 parts by weight of styrene in 180.7 parts by weight of ethanol and 2 parts by weight of Wako V 59 in 100 parts by weight of ethanol were successively added within the next 2 hours. Thereafter, 100 parts by weight of ethanol and 2 parts by weight of Wako V 59 were added during 6 h. The total reaction mixture was kept at 70° C. for another 2 hours, before being submitted to purification by water steam distillation. Mn found by SEC was 10500 g/mol. After drying, a white powder was recovered.

Example 14: Preparation of Copolymer X14 in Isopropanol (Sty:PEGMA2000=1:1)

300.4 parts by weight of isopropanol, 400 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of isopropanol were added in the reactor at 70° C. within one hour. Additionally, 5.2 parts by weight of styrene in 80 parts by weight of isopropanol and 2 parts by weight of Wako V 59 in 100 parts by weight of isopropanol were successively added within the next 2 hours. Thereafter, 100 parts by weight of isopropanol and 2 parts by weight of Wako V 59 were added during 6 h. The total reaction mixture was kept at 70° C. for another 2 hours, before being submitted to purification by water steam distillation. Mn found by SEC was 18500 g/mol. After drying, a white powder was recovered.

Example 15: Coating of Model Surfaces and Fouling Evaluation by QCM-D

The Quartz-Crystal Microbalance with dissipation monitoring (QCM-D) measures the frequency of a freely oscillating quartz crystal after excitation, which scales inversely with mass changes at the surface of the sensor. The Q-Sense E4 (Biolin Scientific Holding AB) operating system has a mass sensitivity of about 2 ng/cm$^2$. QCM measurements were performed using standard flow-through methods with a flow rate of 250 μL/min at 23° C. A typical experiment comprised the following steps: 1) 10 mmol/L HEPES buffer pH 7 (="buffer") until a stable baseline was achieved; 2) 2 h 0.1 wt % polymer solution in buffer; 3) 2 h buffer; 4) 0.5 h 0.1 wt % milk powder in buffer; 5) 0.5 h buffer.

Model polymer layers were generated on the QCM sensor surface by dip coating (for PES and PVDF), spin coating (for PS) or wet chemical reaction (for 1-Octadecanethiol). For dip-coating, the sensor was briefly immersed into a 1% solution of the respective polymer in N-methyl-pyrrolidone and subsequently dried at 200° C. using a heat gun. For spin-coating, a 40 μL drop of 1% polymer solution in tetrahydrofuran was placed in the center of the quartz crystal and spread across the surface by spinning at 4000 rpm for 30 s. PA surfaces were obtained by coating on top of a PES layer via chemical modification: first, a drop of 1.5 wt % m-phenylenediamine was applied to the PES layer, followed by addition of about 1 mL 0.05 wt % of 1,3,5-benzenetricarbonyl trichloride; finally, the surface was rinsed with n-hexane. 1-Octadecanethiol layers were prepared by exposing gold-coated quartzes to a 1 mmol/L solution of the thiol in ethanol for 2 h, followed by rinsing with ethanol (3×5 mL) and subsequent drying in a stream of nitrogen. Adsorption of polymer on the model surfaces was carried out by equilibrating the modified quartz sensor surface with 0.1 wt % polymer solution in HEPES buffer until a monolayer was formed (step 2) above). Afterwards, the sensor surface was rinsed with buffer until a stable mass reading was obtained (step 3) above).

Milk fouling was monitored during exposure of the samples to 0.1 wt % solutions of milk powder in HEPES buffer for 0.5 h. The final mass change was recorded after another 0.5 h of rinsing with buffer (steps 4) and 5) above). The results are given in Table 1.

TABLE 1

QCM measurements of fouling caused by milk.

| Example No. | Model surface | Copolymer | Polymer adsorbed on the coated quartz Copolymer adsorbed amount [ng/cm$^2$] | Milk adsorbed amount ([ng/cm$^2$]) | Fouling wt % |
|---|---|---|---|---|---|
| 15.1 | PES | / | / | 458 ± 10 | 100% |
| 15.2 | PVDF | | | 424 ± 25 | |
| 15.3 | PA | | | 404 ± 30 | |
| 15.4 | PS | | | 399 ± 59 | |
| 15.5 | Octadecanethiol | | | 375 ± 59 | |
| 15.6 | PES | X1 | 193 ± 50 | 131 ± 10 | 28.6% |
| 15.7 | PVDF | | 168 ± 70 | 172 ± 30 | 40.6% |
| 15.8 | PA | | 241 ± 50 | 214 ± 25 | 53.0% |
| 15.9 | PES | X2 | 302 ± 30 | 0 ± 2 | 0.0% |
| 15.10 | PVDF | | 400 ± 70 | 19 ± 30 | 4.5% |
| 15.11 | PA | | 309 ± 50 | 38 ± 20 | 9.4% |
| 15.12 | PS | | 781 ± 186 | 30 ± 15 | 7.5% |
| 15.13 | Octadecanethiol | | 445 ± 33 | 42 ± 12 | 11.2% |
| 15.14 | PES | X3 | 311 ± 40 | 16 ± 10 | 3.5% |
| 15.15 | PVDF | | 390 ± 100 | 55 ± 15 | 13.0% |
| 15.16 | PA | | 330 ± 10 | 69 ± 10 | 17.1% |
| 15.17 | PES | X4 | 348 ± 60 | 36 ± 10 | 7.9% |
| 15.18 | PVDF | | 397 ± 50 | 44 ± 10 | 10.4% |
| 15.19 | PA | | 431 ± 20 | 74 ± 20 | 18.3% |
| 15.20 | PES | X5 | 454 ± 100 | 36 ± 15 | 7.9% |
| 15.21 | PVDF | | 377 ± 50 | 43 ± 15 | 10.1% |
| 15.22 | PA | | 608 ± 40 | 43 ± 5 | 10.6% |

TABLE 1-continued

QCM measurements of fouling caused by milk.

| Example No. | Model surface | Polymer adsorbed on the coated quartz | Copolymer adsorbed amount [ng/cm$^2$] | Milk adsorbed amount ([ng/cm$^2$]) | Fouling wt % |
|---|---|---|---|---|---|
| 15.23 | PES | X6 | 266 ± 30 | 17 ± 10 | 3.7% |
| 15.24 | PVDF | | 199 ± 10 | 42 ± 9 | 9.9% |
| 15.25. | PA | | 218 ± 31 | 126 ± 35 | 31.2% |
| 15.26 | PES | X7 | 315 ± 80 | 21 ± 30 | 4.6% |
| 15.27 | PVDF | | 306 ± 41 | 23 ± 9 | 5.4% |
| 15.28 | PA | | 332 ± 98 | 119 ± 18 | 29.5% |
| 15.29 | PES | X8 | 226 ± 8 | 51 ± 13 | 11.1% |
| 15.30 | PVDF | | 251 ± 9 | 97 ± 12 | 22.9% |
| 15.31 | PA | | 180 ± 44 | 145 ± 63 | 35.9% |
| 15.32 | Octadecanethiol | | 226 ± 8 | 51 ± 13 | 13.6% |
| 15.33 | PES | X9 | 304 ± 72 | 53 ± 17 | 11.6% |
| 15.34 | PVDF | | 383 ± 23 | 88 ± 4 | 20.8% |
| 15.35 | PA | | 426 ± 87 | 110 ± 43 | 27.6% |
| 15.36 | Octadecanethiol | | 304 ± 72 | 53 ± 17 | 14.1% |
| 15.37 | PES | X10 | 253 ± 39 | 147 ± 44 | 39.2% |
| 15.38 | PES | X11 | 275 ± 60 | 156 ± 40 | 34.1% |
| 15.39 | PES | X12 | 421 ± 7 | 0 | 0% |
| 15.40 | PES | X13 | 408 ± 25 | 0 | 0% |
| 15.41 | PES | X14 | 343 ± 5 | 0 | 0% |
| 15.42 | PES | X11A | 335 ± 67 | 69 ± 24 | 15.1% |

Example 16: Coating of Hollow Fiber Membranes and Fouling Evaluation by Monitoring the Pure Water Permeability (PWP)

Single multibore ultrafiltration membranes based on polyethersulfone comprising seven bores per membrane (inge, Multibore® 0.9, membrane diameter 4 mm, bore diameter 0.9 mm) were coated with a polymer monolayer by dipping for several hours (at least 2 hours) in a 0.1 wt % polymer solution in water, followed by an extensive rinsing with water to eliminate the polymer excess.

Fouling with milk proteins (obtained from skim milk powder, Merck) was evaluated after dipping the blank and polymer coated single fibers in a 0.1 wt % of aqueous skim milk solution during at least one hour followed by extensive rinsing with water.

Pure Water Permeability (PWP) of single 60 cm long Multibore® hollow fibers was determined on blank membranes, on polymer coated membranes, and on both membrane types after milk fouling using 0.3-0.4 bar applied transmembrane pressure at room temperature. Flux Recovery ("FR") was calculated: a) after polymer coating and b) after fouling with milk proteins using the following equations:

$$a) \quad FR_{coating} = \frac{PWP_{(coated\ membrane)}}{PWP_{(blank\ membrane)}}$$

$$b) \quad FR_{fouling} = \frac{PWP_{(after\ adsorptive\ fouling)}}{PWP_{(before\ fouling)}}$$

The results are given in Table 2.

TABLE 2

Flux Recovery of uncoated multibore membranes and of multibore membranes coated with polymers X1 to X5.

| Ex. | Coated polymer on hollow fiber Multibore ® membranes | FR$_{coating}$ | FR$_{fouling}$ |
|---|---|---|---|
| 16.1 | Blank (uncoated membrane) | / | 59% ± 1% |
| 16.2 | X1 | 41% ± 5% | 90% ± 6% |
| 16.3 | X2 | 28% ± 1% | 104% ± 1% |
| 16.4 | X3 | 37% ± 1% | 93% ± 2% |
| 16.5 | X4 | 51% ± 3% | 79% ± 0% |
| 16.6 | X5 | 57% ± 1% | 73% ± 0% |

Example 17: Coating of Flat Sheet Commercial Membranes and Fouling Evaluation by Monitoring the Pure Water Permeability (PWP)

Commercial flat sheet ultrafiltration membranes based on polyethersulfone (Nadir® UP150, UP050 and UP020) were dip-coated with a polymer monolayer during two hour immersion in a 0.1 wt % polymer solution in water, followed by an extensive rinsing with water to eliminate the polymer excess.

Fouling with proteins was evaluated after dipping the blank and polymer coated membranes in a 0.02 wt % aqueous protein solution during one hour followed by extensive rinsing with water. PWP tests on flat sheet PES Nadir® UP150, UP050, UP020 membranes were carried out in a dead-end cell at room temperature using 10 cm diameter commercial membranes, 1 bar fixed pressure, and 300-600 mL pure water.

Flux Recovery was calculated: after polymer coating of membranes (Equation a), example 16) and after fouling with milk proteins (equation b), example 16):

TABLE 3

Flux Recovery of uncoated flat sheet membranes and of flat sheet membranes coated with polymers X1 to X5.

| Ex. | Coated polymer on flat sheet Nadir® UP150 | $FR_{coating}$ | $FR_{fouling}$ |
|---|---|---|---|
| 17.1 | Blank (uncoated membrane) | / | 25.7% |
| 17.2 | X1 | 37.5% | 58.9.1% |
| 17.3 | X2 | 32.2% | 67.6% |
| 17.4 | X3 | 42.4% | 58.7% |
| 17.5 | X4 | 52.7% | 42.6% |
| 17.6 | X5 | 58.1% | 43.7% |

Example 18: Module Coating and Antifouling Efficiency of Small Modules in Midscale Convergence Test Filtration modules were prepared using three 20 cm long multibore ultrafiltration membranes based on polyethersulfone comprising seven bores per membrane (inge, Multibore® 0.9, membrane diameter 4 mm, bore diameter 0.9 mm) assembled in a tube. Multibore® hollow fibers were end-sealed within the tube by potting with epoxy resin.

The coating procedure with a diluted 0.1 wt % X2 polymer solution using a peristaltic pump ISMATEC Type ISM444B included the following steps: 1) pure water rinsing of the module by 60 mL/min axial flux; 2) closing one end of the module and running pure water during 10 minutes through the membrane pores by 50 mL/min measured axial flux; 3) emptying of the module from water and filling it with a 0.1 wt % X2 polymer solution in water, which is rinsed 90 minutes through the bores at 70 mL/min axial flux; 4) closing one end of the module and running the polymer solution during 10 minutes through the membrane pores by 50 mL/min axial flux; 4) opening of both module ends and rinsing it again with a 0.1 wt % X2 polymer solution during 30 minutes; 5) closing the module containing the polymer solution (both module ends are sealed) over night.

Blank and coated modules were submitted to a 40 hours defined fouling test in a Convergence Inspector—Model Dialysis/UFR system (Convergence Industry B.V).

The Convergence system was run with 0.01 wt % milk protein solution (i.e. obtained from skim milk powder Merck) at 3 kg/h constant feed under dead-end conditions. A backwash with pure water was applied every 20 seconds, followed by a chemical enhanced backwash (CEB) using 30 mmol/L sodium hydroxide solution set to occur when the transmembrane pressure (TMP) reached the maximum value of 0.8 bar. The variations in TMP were recorded against time for both the coated and the uncoated module.

The total number of required CEB and the total amount of produced water were calculated for a module containing blank membrane (Example 18.1) and for the polymer coated module (Example 18.2) are given in Table 4.

TABLE 4

Total number of required CEB and the total amount of produced water for coated and uncoated membrane modules

| Ex. | Module type | Total number of required CEB | Total amount of produced water (kg) |
|---|---|---|---|
| 18.1 | Blank module | 40 | 63 |
| 18.2 | Coated module | 10 | 106 |

Total amount of water produced was 68% higher for the coated module.

Example 19: Pore Size Effect—Coating of Flat Sheet Membranes with Decreasing Pore Sizes and Fouling Evaluation by Monitoring the Pure Water Permeability (PWP)

Ultrafiltration Flat sheet commercial PES Nadir® UP150, UP050 and UP020 membranes with different pore sizes given in Table 5 were coated with the X2 polymer following the procedure detailed in example 17.3.

Fouling with milk proteins (obtained from skim milk powder, Merck) was evaluated after dipping the blank and polymer coated single fibers in a 0.1 wt % of aqueous skim milk solution in water during at least one hour followed by extensive rinsing with water. Flux Recovery was calculated: after polymer coating of membranes (Equation a), example 16) and after fouling with milk proteins (equation b) example 16). The results are given in Table 5.

TABLE 5

Flux Recovery of flat sheet membranes with different pore sizes coated with polymers X2

| Nadir® membrane type | (MWCO) (kDa) | $FR_{coating}$ | $FR_{fouling}$ |
|---|---|---|---|
| UP150 | 150 | 44% ± 16% | 41% ± 12% |
| UP050 | 50 | 31% ± 1% | 33% ± 1% |
| UP020 | 20 | 45% ± 4% | 44% ± 4% |

Example 20: Monolayer Formation and Analysis Monitored by AFM

Tapping Mode

The AFM cantilever is driven by an external actuator at a frequency close to its first flexural resonance frequency and scanned over the surface in a rastering process. As the cantilever is brought close to the surface interaction forces on the nanometer scale arise which dampen the cantilever oscillation. During the measurement, the cantilever height was adjusted by a feed-back control in order to keep the oscillation amplitude constant. This provides a topography image of the surface.

Interaction forces between the cantilever tip and the sample, both mechanical as well as physicochemical in nature, directly affect the phase shift between the external excitation signal of the actuator and the cantilever response. The phase image thus directly relates to material properties and provides information on a mix of elastic modulus, visco-elastic, and adhesion properties and offers a qualitative material contrast.

For all measurements standard AFM Silicon-tips OMCL-AC160TS from Olympus were used (k=42 N/m, $f_0$=300 kHz). All images were obtained using the tapping-mode with constant amplitude attenuation. For each sample, topography and phase images where obtained at a scan rate of 0.8 Hz and were recorded with a scan size of 1×1 µm² and a standard resolution of 512×512 pixels.

FIG. 1 shows Tapping-mode AFM material contrast images of the identical spot on a Nadir UP150 membrane before (A) and after (B) adsorptive coating with polymer X3. The coating procedure was carried out on flat sheet PES Nadir® UP150 analogous to example 17.4.

Topography and phase shift images shown in FIG. 1 were measured using a MFP-3D Atomic Force Microscope (AFM). Images clearly show that a thin layer of a polymer was adsorbed to the porous membrane surface. The layer seems homogeneous, yet thin, as individual pores of the membrane could still be discerned.

Colloidal Probe AFM

Force measurements with the AFM were performed by the colloidal probe technique, where the sharp tip was replaced by a micrometer sized colloidal sphere to improve force sensitivity in nanomechanical measurements and allow for a quantitative analysis of the interaction force, as described in Butt et al., Surface Science Reports, 2005, 59, 1-152. By choosing an appropriate chemical modification of the colloidal probe specific interaction forces, could be measured.

Colloidal Probe measurements were performed on a MFP-3D AFM software version IGOR 6.11. For measurement colloidal probes made of 1) polystyrene, radius 3.3 µm (Polybead® Microspheres), 2) silica, radius 3.2 µm (Silica Microspheres), 3) amino functionalized, radius 3.1 µm (Polybead® Amino Microspheres) were used. The probes were glued to tip-less cantilevers (HQ:CSC38 type A from Fa MikroMasch, k=0.09 N/m) using a 2K epoxy from UHU (UHU plus 300). The probes were dried and hardened for 24 h at room temperature. Force distance curves were performed at ramp speeds of 1 Hz in relative trigger mode (max load 5 nN) and a dwell time of Os. Nadir UP150 membrane samples were immersed for two hours in respective aqueous solutions prior to colloidal probe measurements. In the case of coated membranes, the samples were stored in a 0.1 wt % solution of X3 polymer in water for two hours. Samples were rinsed thoroughly with water to remove excess polymer prior to colloidal probe measurements.

Force-Distance Curves of an —OH functionalized, a —NH2 functionalized and polystyrene colloidal probes (3.2 µm, 3.1 µm and 3.3 µm diameter respectively) were recorded in 1 mM NaCl solution at pH=7.3 on approach against a blank Nadir UP150 membrane and a Nadir UP150 coated with polymer X3. The partially negatively charged PES membrane surface attracts the amino functionalized probe on approach, as is evident in the observed snap-in (negative or attractive interaction force) at a distance of a few nanometers to the surface. On the other hand, no attractive interaction is observed in the case of the —OH terminated, as well as the polystyrene probe. Upon coating with X3 polymer a steric penalty is added and all probes independent of their chemistry or partial surface charge experience a repulsive force upon approach, which is more pronounced for the hydrophilic probes than hydrophobic ones.

Besides an introduction of steric repulsion on approach, the Sty:PEGMA coating also reduces the adhesiveness.

The cumulative distribution function for adhesion of a —NH2 functionalized and a polystyrene colloidal probe were recorded in 1 mM NaCl solution at pH=7.3 against a blank Nadir UP150 membrane and a Nadir UP150 membrane coated with polymer X3.

The cumulative distribution function for adhesion of a —NH2 functionalized colloidal probe, representing a hydrophilic moiety, on a blank Nadir UP150 membrane is very broad ranging from a few nN/m to ~4.5 mN/m, with a variable slope. d10~0.1 mN/m, d50~0.6 mN/m and d90~3 mN/m. This curve is dramatically shifted towards lower adhesion reaching 100% already at ~0.1 mN/m once the Sty:PEGMA coating is applied.

This implies that both the modes of interaction, which is indicative of a uniform functionalization of the Nadir UP150 membrane, as well as the magnitude of interaction or adhesiveness, are dramatically reduced. The polystyrene probe which serves as an example of a hydrophobic moiety adheres less strongly to the native Nadir UP150 membrane but still sticks (100% reached at 0.5 mN/m). Further, after coating the Nadir UP150 membrane with polymer X3 adhesion of hydrophobic moieties of the polystyrene probe is strongly reduced (100% reached at <0.1 mN/m).

What is claimed is:

1. A process for reducing fouling of a surface O, the process comprising:
    preparing an aqueous solution S comprising at least one polymer P formed from styrene and polyethylene glycol methacrylic ester by solution polymerization in water, ethanol, 1-propanol, isopropanol, or combinations thereof, wherein the aqueous solution S comprises at least 50% by weight of water; and
    applying the aqueous solution S to the surface O,
    wherein the polymer P has a number average molecular weight Mn of from 8,830 to 50,700 g/mol, wherein the polyethylene glycol methacrylic ester has a number average molecular weight Mn of from 550 to 2,000 g/mol, and wherein the polymerization reaction is carried out using a molar ratio of styrene:polyethylene glycol methacrylic ester of from 20:1 to 1:4.

2. The process according to claim 1, wherein the surface O is a membrane M.

3. The process according to claim 1, wherein the polymer P has a number average molecular weight Mn of from 10,900 to 29,000.

4. The process according to claim 1, wherein the polymer P is a statistical copolymer.

5. The process according to claim 1, wherein the aqueous solution S comprises 0.001 to 1% by weight of said at least one polymer P.

6. The process according to claim 1, wherein the at least one polymer P is applied to the surface O in intervals of 1 day to 24 months.

7. The process according to claim 2, wherein the membrane M is a RO, FO, NF, UF or MF membrane.

8. The process according to claim 1, wherein said process is used in treating industrial or municipal waste water, sea water, brackish water, fluvial water, surface water or drinking water, desalination of sea or brackish water, dialysis, plasmolysis or processing of food and beverages.

9. The process of claim 1 wherein the solution polymerization occurs in water, ethanol, isopropanol, or combinations thereof, and the polymer P has a number average molecular weight Mn of from 10,500 to 18,500 g/mol.

10. The process of claim 1 wherein the solution polymerization occurs in a combination of water and 1-propanol.

11. The process of claim 1 wherein the solution polymerization occurs in a combination of water and isopropanol.

12. The process of claim 1 wherein the polyethylene glycol methacrylic ester has a number average molecular weight Mn of 550 g/mol, the solution polymerization occurs in a combination of water and 1-propanol, and the polymer P has a number average molecular weight Mn of from 10,900 to 50,700 g/mol.

13. The process of claim 12 wherein the polymerization reaction is carried out using a molar ratio of styrene:polyethylene glycol methacrylic ester of 1:1.

14. The process of claim 1 wherein the polyethylene glycol methacrylic ester has a number average molecular weight Mn of 1,000 g/mol, the solution polymerization occurs in a combination of water and 1-propanol, and the polymer P has a number average molecular weight Mn of from 10,900 to 50,700 g/mol.

15. The process of claim 14 wherein the polymerization reaction is carried out using a molar ratio of styrene:polyethylene glycol methacrylic ester of 1:1 to 1:4.

16. The process of claim 1 wherein the polyethylene glycol methacrylic ester has a number average molecular weight Mn of 2,000 g/mol, the solution polymerization occurs in a combination of water and 1-propanol, and the polymer P has a number average molecular weight Mn of from 10,900 to 50,700 g/mol.

17. A process for reducing fouling of a membrane, the process comprising:
    preparing an aqueous solution S comprising at least one polymer P formed from styrene and polyethylene glycol methacrylic ester by solution polymerization in a combination of water and 1-propanol wherein the aqueous solution S comprises at least 50% by weight of water; and
    applying the aqueous solution S to the membrane M to form a layer of the at least one polymer P on the membrane,
    wherein the membrane M is a RO, FO, NF, UF or MF membrane,
    wherein the layer is a self-assembled monolayer,
    wherein the at least one polymer P is a statistical copolymer and has a number average molecular weight Mn of from 10,900 to 50,700 g/mol, wherein the polyethylene glycol methacrylic ester has a number average molecular weight Mn of 2,000 g/mol, wherein the polymerization reaction is carried out using a molar ratio of styrene:polyethylene glycol methacrylic ester of from 20:1 to 1:4, and
    wherein the aqueous solution S comprises 0.001 to 1% by weight of the at least one polymer P.

18. The process according to claim 17,
    wherein the at least one polymer P is applied to the surface O in intervals of 1 day to 24 months, and
    wherein said process is used in treating industrial or municipal waste water, sea water, brackish water, fluvial water, surface water or drinking water, desalination of sea or brackish water, dialysis, plasmolysis or processing of food and beverages.

19. A process for reducing fouling of a membrane, the process comprising:
    preparing an aqueous solution S comprising at least one polymer P formed from styrene and polyethylene glycol methacrylic ester by solution polymerization in a combination of water and isopropanol, wherein the aqueous solution S comprises at least 50% by weight of water; and
    applying the aqueous solution S to the membrane M to form a layer of the at least one polymer P on the membrane,
    wherein the membrane M is a RO, FO, NF, UF or MF membrane,
    wherein the layer is a self-assembled monolayer,
    wherein the at least one polymer P is a statistical copolymer and has a number average molecular weight Mn of from 10,500 to 18,500 g/mol, wherein the polyethylene glycol methacrylic ester has a number average molecular weight Mn of 2,000 g/mol, wherein the polymerization reaction is carried out using a molar ratio of styrene:polyethylene glycol methacrylic ester of 1:1, and
    wherein the aqueous solution S comprises 0.001 to 1% by weight of the at least one polymer P.

20. The process according to claim 19,
    wherein the at least one polymer P is applied to the surface O in intervals of 1 day to 24 months, and
    wherein said process is used in treating industrial or municipal waste water, sea water, brackish water, fluvial water, surface water or drinking water, desalination of sea or brackish water, dialysis, plasmolysis or processing of food and beverages.

21. A process for reducing fouling of a membrane, the process comprising:
    preparing an aqueous solution S comprising at least one polymer P formed from styrene and polyethylene glycol methacrylic ester by solution polymerization in a combination of water and 1-propanol, wherein the aqueous solution S comprises at least 50% by weight of water; and
    applying the aqueous solution S to the membrane M to form a layer of the at least one polymer P on the membrane,
    wherein the membrane M is a RO, FO, NF, UF or MF membrane,
    wherein the layer is a self-assembled monolayer,
    wherein the at least one polymer P is a statistical copolymer and has a number average molecular weight Mn of from 8,830 to 39,100 g/mol, wherein the polyethylene glycol methacrylic ester has a number average molecular weight Mn of 550 to 1,000 g/mol, wherein the polymerization reaction is carried out using a molar ratio of styrene:polyethylene glycol methacrylic ester of 1:1, and
    wherein the aqueous solution S comprises 0.001 to 1% by weight of the at least one polymer P.

22. The process according to claim 21,
    wherein the at least one polymer P is applied to the surface O in intervals of 1 day to 24 months, and
    wherein said process is used in treating industrial or municipal waste water, sea water, brackish water, fluvial water, surface water or drinking water, desalination of sea or brackish water, dialysis, plasmolysis or processing of food and beverages.

* * * * *